United States Patent [19]
Nadehara

[11] Patent Number: 5,907,500
[45] Date of Patent: May 25, 1999

[54] MOTION COMPENSATION ADDER FOR DECODING/DECOMPRESSING COMPRESSED MOVING PICTURES

[75] Inventor: Kouhei Nadehara, Tokyo, Japan

[73] Assignee: NEC Corporation, Tokyo, Japan

[21] Appl. No.: 08/950,834

[22] Filed: Oct. 15, 1997

[30] Foreign Application Priority Data

Oct. 21, 1996 [JP] Japan .................................. 8-277662

[51] Int. Cl.$^6$ ................................ G06F 7/50; H04N 7/12
[52] U.S. Cl. ...................................... 364/784.01; 348/415
[58] Field of Search ..................... 364/725.01, 725.02, 364/725.03, 745.01, 745.02, 784.01; 348/402, 412, 413, 414, 415, 416, 699; 382/236, 238

[56] References Cited

U.S. PATENT DOCUMENTS

| 5,457,481 | 10/1995 | Sohn et al. | 345/185 |
| 5,619,256 | 4/1997 | Haskell et al. | 348/43 |
| 5,737,022 | 4/1998 | Yamaguchi et al. | 348/416 |

OTHER PUBLICATIONS

Kouhei Nadehara et al., "Low–Power Multimedia RISC", *IEEE Micro*, Dec. 1995, pp. 20–28.

*Primary Examiner*—Chuong Dinh Ngo
*Attorney, Agent, or Firm*—Sughrue, Mion, Zinn, Macpeak & Seas, PLLC

[57] ABSTRACT

A motion compensation adder for increasing a motion compensation processing speed is provided in a microprocessor having a multiply-accumulate instruction. A pixel value of a predicted picture which is expressed by an unsigned value is loaded into a register, and the most significant bit is inverted to format-convert the pixel value to a signed value with –128-offset. When hexadecimal constant 0x01000000 as a multiplicand, a signed error value as a multiplier and the format-converted pixel value of the predicted picture stored in the most significant byte of the register as an addition value are supplied to a multiply-accumulate instruction having a clipping function, the multiply-accumulate instruction performs the addition of the pixel value of the predicted picture and the error value and the clipping processing needed for the motion compensation adding processing by only one instruction.

12 Claims, 10 Drawing Sheets

FIG.1

| 8-BIT UNSIGNED VALUE WITHOUT OFFSET | | 8-BIT SIGNED VALUE WITH -128-OFFSET | |
|---|---|---|---|
| DECIMAL NOTATION | BINARY NOTATION | DECIMAL NOTATION | BINARY NOTATION |
| 0 | 00000000 | -128 | 10000000 |
| 1 | 00000001 | -127 | 10000001 |
| 2 | 00000010 | -126 | 10000010 |
| ⋮ | ⋮ | ⋮ | ⋮ |
| 126 | 01111110 | -2 | 11111110 |
| 127 | 01111111 | -1 | 11111111 |
| 128 | 10000000 | 0 | 00000000 |
| 129 | 10000001 | 1 | 00000001 |
| ⋮ | ⋮ | ⋮ | ⋮ |
| 254 | 11111110 | 126 | 01111110 |
| 255 | 11111111 | 127 | 01111111 |

FORMAT CONVERSION
INVERSION OF MOST SIGNIFICANT BIT

INVERSE FORMAT CONVERSION
INVERSION OF MOST SIGNIFICANT BIT

FIG. 8

| LOAD/STORE INSTRUCTION |
|---|
| ld.b imm16 [reg1], reg2 |
| ld.h imm16 [reg1], reg2 |
| ld.w imm16 [reg1], reg2 |
| st.b reg2, imm16 [reg1] |
| st.w reg2, imm16 [reg1] |

| ARITHMETIC LOGICAL INSTRUCTION |
|---|
| add reg1, reg2 |
| add imm16, reg2 |
| andi reg1, reg2 |
| mac reg1, reg2, reg3 |
| max3 reg1, reg2, reg3 |
| min3 reg1, reg2, reg3 |
| mov reg1, reg2 |
| mov imm, reg2 |
| xor reg1, reg2 |

| SHIFTER INSTRUCTION |
|---|
| shl imm5, reg1 |
| shr imm5, reg1 |
| shrd3 reg1, reg2, reg3 |

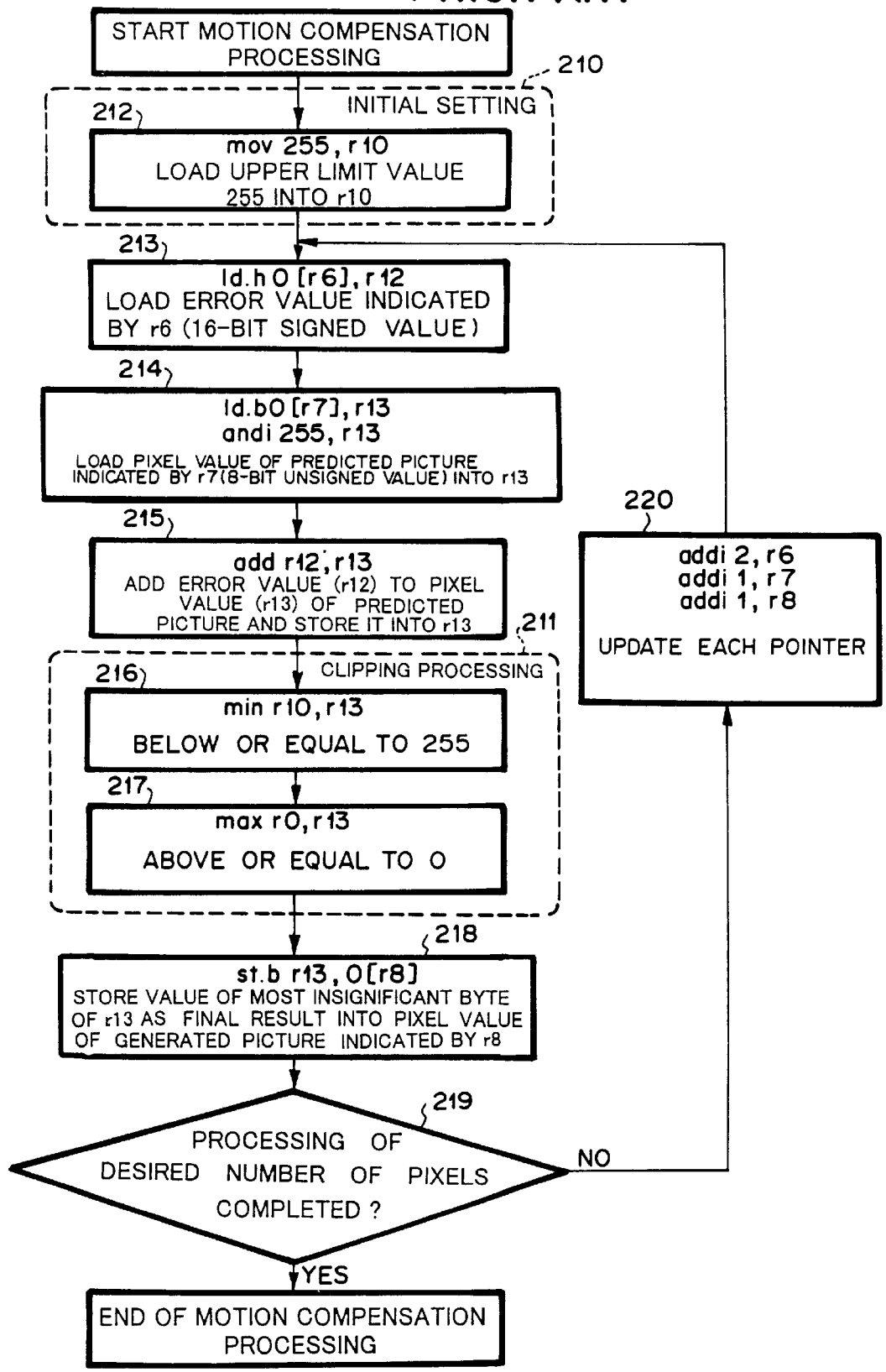

MOTION COMPENSATION ADDER FOR DECODING/DECOMPRESSING COMPRESSED MOVING PICTURES

BACKGROUND OF THE INVENTION

1. Field of the Invention

The present invention relates to a motion compensation adder which is used to decode compressed moving pictures.

2. Description of the Related Art

Multimedia applications to information equipment which is represented by a personal computer are increasingly propagating, and such information equipment is being newly provided with a new function of handling voices (speech), audio, still pictures and moving pictures as well as an old function of handling information only characters which has been hitherto provided. Each of such so-called multimedia data as voices, audio, still pictures, moving pictures, etc. have an extremely large data amount, so that the data are generally processed so as to be just removed and compressed to one several-tenths of the original data amount by using a compression technique in conformity with the characteristic of each data, then stored in an external storage device or transmitted through a communication, and then decoded on multimedia information equipment.

For example, for compression and decompression of moving pictures, it is general to perform the data processing in conformity with so-called MPEG (Moving Pictures Experts Group)—1 video standards (ISO/IEC JTC1 CD 11172, Information Technology-Coding of Moving Pictures and Associated Audio for Digital Storage Media up to 1.5 Mbit/s; Part 2: Coding of Moving Picture Information). In order to decode and display in real time the data which are compressed according to the MPEG-1 video standards, it is needed to perform operation processing at a rate of several million instructions per second. Therefore, a custom LSI which is designed for MPEG-1 video decompression or a special signal processor for video processing has been hitherto used. However, the debut of a new microprocessor architecture which is represented by RISC (Reduced Instruction Set Computer) has drastically enhanced the performance of general-purpose microprocessors, and the development of microstructure design and the increase of processing speed in an LSI process technique have made it possible to easily integrate signal processing hardware such as a multiply-accumulate (sum-of-products) multiply-accumulator, etc., and these developments of the LSI process technique has promoted such a tendency that the MPEG-1 video decompression is performed by software on a general-purpose microprocessor which has been hitherto installed in a device, whereby an exclusively-used LSI or a video signal processor can be omitted, resulting in reduction of the price of the multimedia equipment.

At present, there have been publicly known some processors which aim to perform the video signal processing by software on a general-purpose microprocessor. In this specification, a 32-bit microprocessor V830 of NEC which is disclosed in "Nikkei Electronics", No. 635 (May 8, 1995), pp 111–121, and in "IEEE MICRO Magazine", Vol. 15, No. 6 (December 1995), pp 20–29, is targeted, and a system for increasing the speed of motion compensation processing which needs the largest processing amount in the MPEG-1 video decompression will be described by using the 32-bit microprocessor V830.

The architecture and the principle of the motion compensation processing of the 32-bit microprocessor V830 and the conventional motion compensation processing will be described.

First, the architecture and the instruction set of the 32-bit microprocessor V830 of NEC will be briefly described as an example of a microprocessor having enhanced signal processing functions.

FIG. 7 is a block diagram showing a system for performing motion compensation by using the V830 microprocessor. This system includes a microprocessor 11 for performing operation processing, and a main memory 10 for storing a program 20 and data 21. The microprocessor 11 includes a register file 12 having thirty-two(32) bit length in which data 21 on the main memory 10 are stored, and an execution unit 13 for performing operation on the data on the register file 12. The execution unit 13 includes an arithmetic logic unit 28 for performing arithmetic operations such as addition and subtraction, and logical operations such as logical sum (OR), logical product (AND), exclusive OR, etc., a bit shifter 29 for performing a bit shift operation, and a multiply-accumulator 30 for performing multiply and multiply-accumulate operations or instructions.

FIG. 8 shows a part of the instruction set of the microprocessor V830 while the part is sectioned into a load/store instruction, an arithmetic and logical instruction and a shift instruction. The instructions shown in FIG. 8 will be described.

With ld.b (Load Byte) instruction, the value obtained by sign-extended 16-bit immediate value imm16 to 32-bit is added with 32-bit length data of register reg1 to generate a 32-bit length address, and data of 1 byte (8 bits) are read out from the position on the main memory which is indicated by the address thus generated, sign-decoded to 32-bit length and then stored in register reg2.

With ld.h (Load Halfword) instruction, the value obtained by sign-decoding 16-bit immediate value imm16 to 32-bit is added with 32-bit data of the register reg1 to generate a 32-bit length address, and data of 1 half word (16 bits) are read out from the position on the main memory which is indicated by the address thus generated, sign-decoded to 32-bit length and then stored in the register reg2.

With ld.w (Load Word) instruction, the value obtained by sign-decoding 16-bit immediate value imm16 to 32-bit is added with 32-bit data of the register reg1 to generate a 32-bit length address, and data of 1 word (32 bits) are read out from the position on the main memory which is indicated by the address generated and then stored in the register reg2.

With st.b (Store Byte) instruction, the value obtained by sign-decoding 16-bit immediate value imm16 to 32-bit is added with 32-bit length data of the register reg1 to generate a 32-bit address, and data of the least significant byte (8 bits) of the register reg2 are stored at the position on the main memory which is indicated by the address thus generated.

With st.w (Store Word) instruction, the value obtained by sign-decoding 16-bit immediate value imm16 to 32-bit is added with 32-bit data of the register reg1 to generate a 32-bit address, and data of 1 word (32 bits) which are held by the register reg2 are stored at the position on the main memory which is indicated by the address thus generated.

With add (Addition) instruction, the word (32-bit) data which are held by the register reg2 are added with the word data which are held by the register reg1, and then the addition result is stored in the register reg2.

With addi (Add Immediate) instruction, the value obtained by sign-decoding 16-bit immediate value imm16 to 32-bit is stored in the register reg2.

With andi (AND Immediate) instruction, the value obtained by sign-decoding 16-bit immediate value to 32-bit and the word length data held in the register reg2 are subjected to logical product every bit, and the result is stored in the register reg2.

With mac (Multiply and Accumulate) instruction, multiplication result of word data in the register reg1 and word data in the register reg2 is added with word length data held in the register reg1, and then the addition result is subjected to clipping processing of 32-bit length and stored in the register reg2. The clipping processing replaces the addition result with 0x7fffffff if the addition result is larger than 0x7fffffff and with 0x80000000 if the addition result is smaller than 0x80000000, thereby reducing an error when the addition result cannot be expressed by signed 32-bit format and thus it overflows. Here, 0x represents hexadecimal expression.

With max (Maximum) instruction, word (32-bit) data held by the register reg2 and word length data held by the register reg1 are compared as a signed integer, and a larger value is stored in the register reg3.

With min (Minimum) instruction, word (32-bit) data held by the register reg2 and word data held by the register reg1 are compared as a signed integer, and a smaller value is stored in the register reg3.

With mov (move) instruction, word (32-bit) length data held by the register reg1 or the value obtained by sign-decoding immediate value imm to word (32-bit) are stored in the register reg2.

With xor (Exclusive Or) instruction, word (32-bit) data held by the register reg2 and word data held by the register reg1 are subjected to exclusive OR every bit, and the result is stored in the register reg2.

With shl (Shift Left) instruction, the lower 32 bits of the result obtained by subjecting word (32-bit) data held by the register reg1 to logical left shift by the bit number which is indicated by immediate value imm5, is stored in the register reg1.

With shr (Shift Right) instruction, the result obtained by subjecting word (32-bit) data held by the register reg1 to logical right shift by the bit number which is indicated by immediate value imm5, is stored into the register reg1.

With shrd3 (Shift Right Doubleword) instruction, double word (64-bit) length data which contain word (32-bit) length data held by the register reg3 as an upper word and word length data held by the register reg2 as a lower word, are subjected to right shift by the bit number indicated by lower 5 bits of the register reg3, and then lower 32 bits of the result are stored in the register reg2.

The microprocessor V830 adopts the load store architecture, and an operation target (operand) is limited to data which are put on the register file. Accordingly, in order to operate data on the main memory, there is needed a procedure of transferring the data from the main memory onto the register file in accordance with a load instruction before the operation, operating the data and then transferring the operation result on the register file onto the main memory in accordance with a store instruction. The program 20 put on the main memory 10 is described by using a instruction set shown in FIG. 8 to control the operation of the microprocessor 11.

Next, the motion compensation will be described with reference to FIGS. 7 and 9. In the motion compensation processing, a pixel value of a predicted picture which is expressed by an unsigned value indicated by a motion vector is added with an error value which is subjected to inverse DCT (Discrete Cosine Transform) and expressed by a signed value to generate a pixel of a new picture.

In an actual system, as shown in FIG. 7, a pixel value 22 of a predicted picture which corresponds to an input of the motion compensation processing and an error value 23 are stored on the main memory 10, and the respective places thereof are indicated by pointers put on the register file 12 of the microprocessor 11. Further, a pixel value of a generated picture which corresponds to an output of the motion compensation processing is stored at a place on the main memory 10 which is indicated by another pointer put on the register file 12 of the microprocessor 11.

The details of the motion compensation processing of one pixel will be described with reference to FIG. 9. Before the motion compensation processing is started, a pointer PP to the pixel value 22 of the predicted picture, a pointer pe to the error value 23 and a pointer pc to the pixel value 24 of the generated picture are assumed to be stored on the register file 12.

First, a pixel value p of a predicted picture which is expressed by 8-bit unsigned value by referring to the pointer pp to the pixel value 22 of the predicted picture and an error value e which is expressed by 16-bit signed value by referring the pointer pe to the error value 23 are obtained from the main memory, and then stored in the register file 12 (201).

Secondly, the pixel value p of the predicted picture is converted to signed value and added with the error value e, and then stored in a temporary variable t which is ensured on the register file 12 (203).

Thirdly, clipping processing is performed so that the temporary variable t is set to a value in the range from 0 to 255 which can be expressed by 8-bit unsigned value (200). Specifically, the temporary variable t is compared with 255 (203), and if the temporary variable t is larger than 255, 255 is set to the temporary variable t (204). Further, the temporary variable t is compared with 0 (205), and if the temporary variable t is smaller than 0, 0 is set to t (206).

Fourthly, the temporary variable t is stored at a place on the main memory 10 which is indicated by the pointer pc to the pixel value of the generated picture (207).

Finally, the conventional motion compensation processing method will be described with reference to FIG. 10.

In the conventional motion compensation processing, the error value and the pixel value of the predicted picture which are stored in the main memory 10 are taken out, and then stored into the register to be added with each other. The addition result is subjected to the clipping processing by using two different instructions.

In the case of FIG. 10, at a initialize step (210), with a instruction move 255, r10, the upper limit of the pixel value of the generated picture is put on r10 (212), and the error value 23 (corresponding to the error value e in FIG. 9) is stored in a register r12 in step 213 while the pixel value 22 of the predicted picture (corresponding to the pixel value p of the predicted picture in FIG. 9) is stored in a register r13 in step 214, and then added (215, corresponding to 202 in FIG. 9) and subjected to the clipping processing 211 to thereby obtain the pixel value 24 (corresponding to the pixel value c of the generated picture in FIG. 9) of the generated picture on r13.

When the pixel value is stored in the register r13 (214), the load byte (ld,b) instruction of the microprocessor V830 regards a value to be loaded as an 8-bit signed value although the pixel value is a 8-bit unsigned value, and thus it performs 24-bit sign-extension. Therefore, it is necessary to set the sign-decompression portion to zero at all times by andi instruction.

A clipping procedure 211 is the same as disclosed in "IEEE MICRO Magazine", Vol.15, No. 6 (December 1995), in FIG. 6(b) at page 25, and it performs the clipping without branch by using the minimum instruction (min) and the maximum instruction (max) in addition to the addition instruction of the pixel value of the predicted image and the error value which are introduced for signal processing by he microprocessor V830. That is, one register having a smaller value is selected from the register r13 in which the pixel value of the generated picture is stored and the register r10 which loads the constant 255 at the initial setting 210 (216), and subsequently one register having a larger value is selected from the register r13 in which the pixel value of the generated picture is stored and the register r0 which holds zero at all times (217), whereby the clipping processing 211 of limiting the pixel value of the generated picture to a value between 0 and 255. The pixel value of the generated picture after the clipping processing 211 is finished is stored at the position which is indicated by the register r8 (219).

The procedure from step 213 to step 218 corresponds to the processing of one pixel shown in FIG. 9. Actually, the processing of desired numbered of pixels is continuously performed while renewing the pointer (220).

In the motion compensation procedure shown in FIG. 10, in addition to the addition instruction of the pixel value of the predicted picture and the error value, the minimum instruction and the maximum instruction are needed to perform the clipping processing, so that there is a problem that the operation amount needed for one operation of the motion compensation processing is increased. Since the motion compensation processing is performed every pixel, one operation of the processing is simple, but it must be accessed at an extremely large frequency, so that it occupies most of the operation amount of the whole MPEG video decompression processing. Accordingly, the increase of the number of instructions needed for one operation of the motion compensation processing, even though the access frequency is merely several operations, greatly reduces the MPEG video decompression performance.

SUMMARY OF THE INVENTION

An object of the present invention is to provide a motion compensation adder which can increase the speed of motion compensation processing.

In order to attain the above object, according to a first aspect of the present invention, a motion compensation adder includes means for format-converting a pixel value of a predicted picture which is expressed by (n−1)-bit unsigned value to $(-2^{n-1})$-offset (n−1)-bit signed value, means for performing addition of the pixel value of the predicted picture after the format conversion and the error value expressed by signed value, and clipping processing of limiting the addition result to a range which can be expressed by (n−1)-bit signed value, on the basis of a multiply-accumulate operation instruction having one saturation function, and means for inversely format-transforming the result after the clipping processing to (n−1)-bit unsigned value again.

Further, according to a second aspect of the present invention, a motion compensation adder includes means for storing a plurality of pixel values of a predicted picture expressed by (n−1)-bit unsigned values into one register to collectively format-transforming the pixel values to $(-2^{n-1})$ offset (n−1)-bit signed values, means for performing addition of the pixel value of the predicted picture after the format transformation and the signed error value, and clipping processing of limiting the addition result to a range which can be expressed by (n−1)-bit signed value, on the basis of a multiply-accumulate operation instruction having one saturation function, and means for storing a plurality of clipping results into one register again and collectively inversely format-transforming the clipping-processing results to (n−1)-bit unsigned value again.

As described above, according to the present invention, the addition of the pixel value of the predicted picture and the error value and the clipping processing in the motion compensation processing are performed by using one multiply-accumulate instruction having the clipping function. The multiply-accumulate instruction having the clipping function performs multiply, addition of the multiplication result and the accumulated value and the clipping processing on the addition result by one instruction, and thus it can perform, with only one instruction, digit weight matching between the error value and the pixel value of the predicted picture by using the multiply portion of the multiply-accumulate instruction, the addition of the pixel value of the predicted picture and the error value by using the addition portion of the multiply-accumulate instruction, and the clipping processing on the addition value of the pixel value of the predicted picture and the error value by using the clipping portion of the multiply-accumulate instruction, whereby the motion compensation processing speed can be increased.

BRIEF DESCRIPTION OF THE DRAWINGS

FIG. 1 is a diagram showing the relationship between an input and an output at the format-conversion according to the present invention;

FIG. 8 is a diagram showing a part of an instruction set of a microprocessor V830;

FIG. 10 is a flowchart showing conventional motion compensation processing.

DETAILED DESCRIPTION OF THE PREFERRED EMBODIMENTS

Preferred embodiments according to the present invention will be described with reference to FIGS. 1 to 8.

Before describing the details of each embodiment, the format conversion used in this embodiment will be described.

Figure 9:
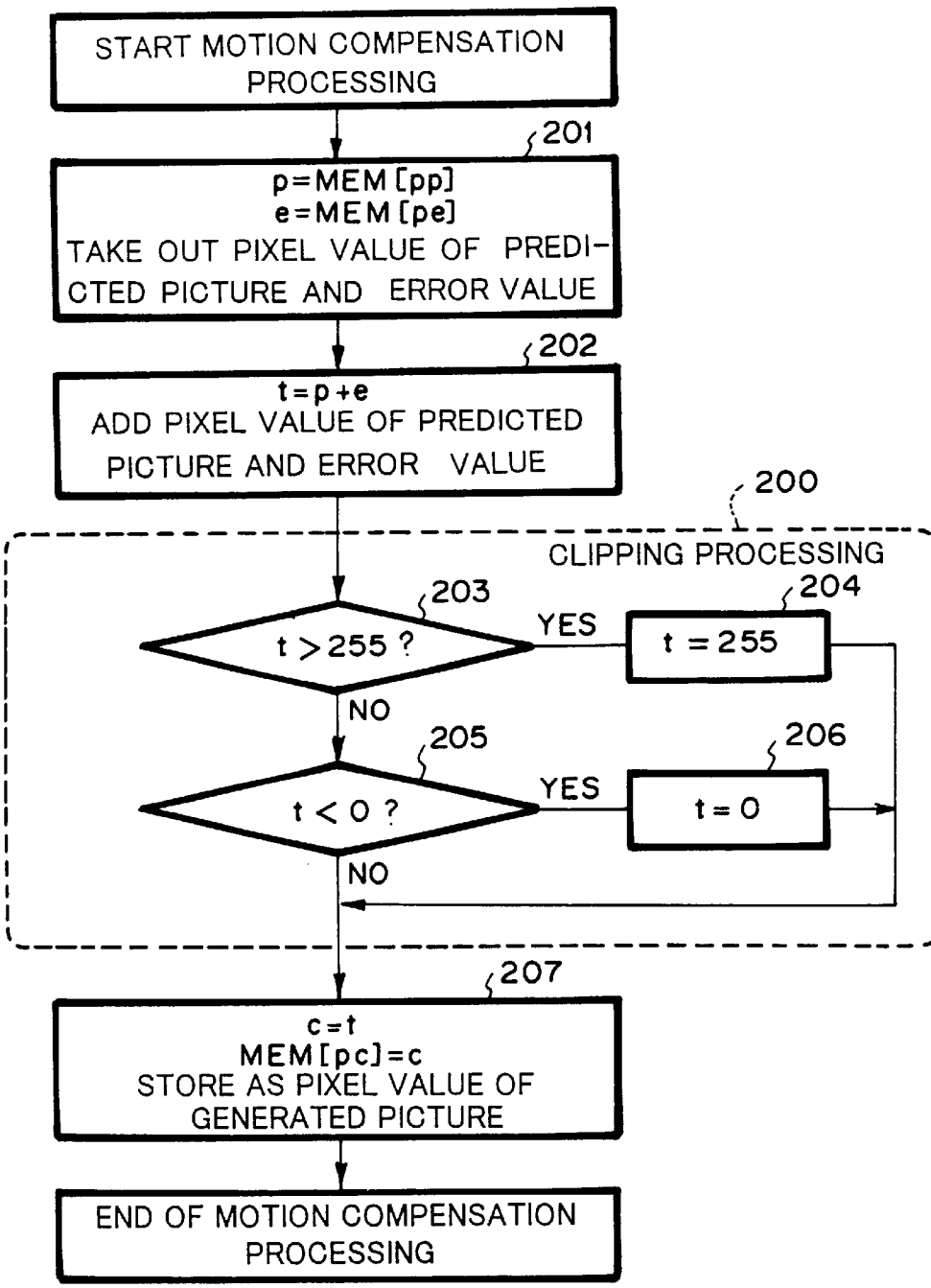
FIG. 9 is a diagram showing the principle of the motion compensation processing.

As shown in FIG. 9, each of the pixel value of the predicted picture and the pixel value of the generated picture is a 8-bit (n−1) unsigned value, and thus 256 values from 0 to 255 ($2^n$) can be taken. Here, a format conversion of inverting the most significant bit is subjected to the pixel values which are 8-bit unsigned values. At this time, as shown in FIG. 1, these values are converted to 8-bit signed values which are added with an offset of −128 ($-2^{n-1}$), and thus 256 values from −128 ($-2^{n-1}$) to 127 ($2^{n-1}$) can be taken. Conversely, when an inverse format conversion of inverting the most significant bit is subjected to 8-bit signed values each of which is added with an offset of −128 (hereinafter referred to as "8-bit signed value with −128 offset", the −128-offset 8-bit signed values are transformed to 8-bit unsigned values having no offset (hereinafter referred to as "8-bit unsigned value without offset". Here, "offset" is clearly specified for values added with an offset, and the presence or absence of "offset" is not described for values added without offset.

Next, the relationship between the format conversion and the clipping processing will be described. The clipping processing of limiting a unsigned value without offset shown in FIG. 9 to a value between 0 and 255 which can be expressed by 8 bits corresponds to the clipping processing of performing the format conversion on an 8-bit unsigned value and then limiting a 8-bit signed value with −128-offset thus obtained to a value between −128 and 127 which can be expressed by 8 bits. Accordingly, the clipping processing of limiting a pixel value corresponding to a 8-bit unsigned value without offset to a value between 0 and 255 provides the same result as the processing of performing the clipping processing of inverting the most significant bit of a pixel value to obtain 8-bit signed value with −128-offset and then limiting the value to a value between −128 and 127 and then performing the inverse format conversion of inverting the most significant bit again to obtain a 8-bit unsigned value without offset.

Figure 2:
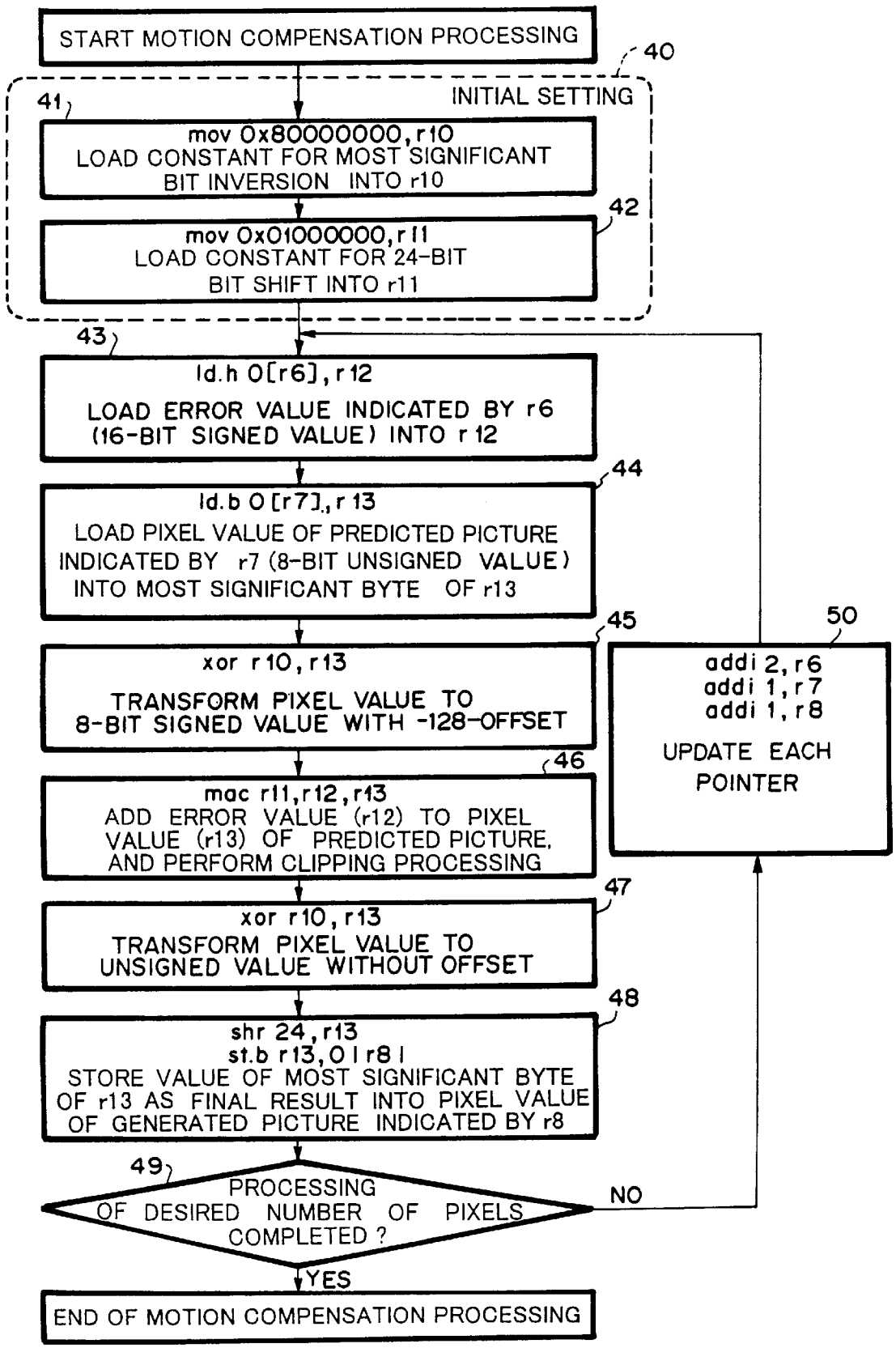
FIG. 2 is a flowchart showing a first embodiment according to the present invention.
Figure 7:
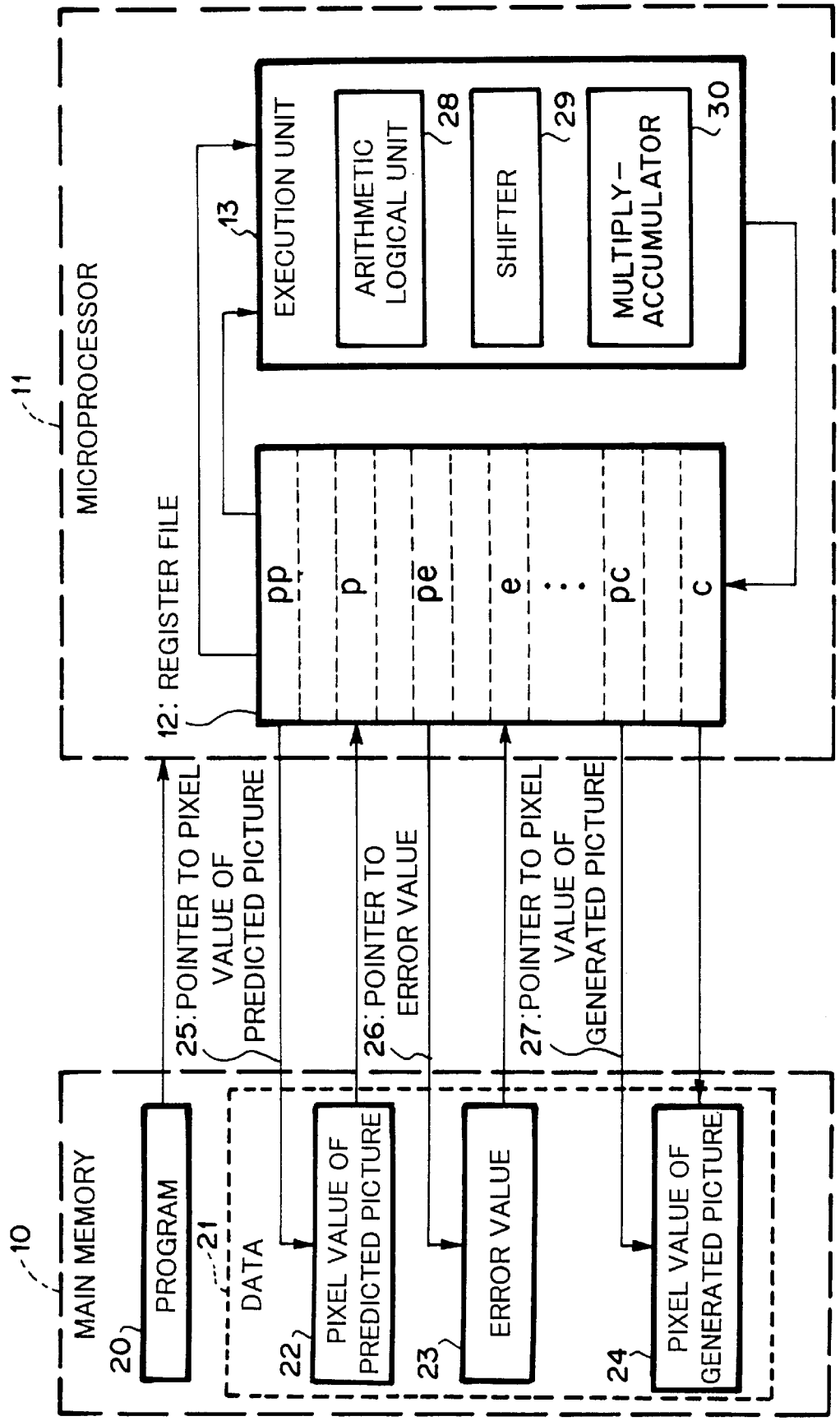
FIG. 7 is a block diagram showing a motion compensation processing system used in the present invention.

FIG. 2 shows the first embodiment of the present invention on the motion compensation processing system using the V830 shown in FIG. 7. Before describing the motion compensation processing shown in FIG. 2, it is assumed that a register r6 holds the value corresponding to the pointer pe to the error value, a register r7 holds the value corresponding to the pointer pp to the pixel value of the predicted picture and a register r8 holds the value corresponding to the pointer pc to the pixel value of the generated picture, respectively in FIG. 9.

First, a constant which is used for subsequent processing is loaded as an initial setting 40 into registers r10 and r11. A value of the 32-bit length register in which only the most significant bit of the 32-bit length register is set to 1 is loaded into the register r10 (41), and a value which is equal to $2^{24}$ is loaded into the register r11 (42). Here, the hexadecimal constant is expressed by adding it with 0×.

Subsequently, the motion compensation processing is performed every pixel. First, an error value (corresponds to e in FIG. 9) which is expressed by a 16-bit signed value is taken out from the address (corresponds to e in FIG. 9) which is indicated by the register r6, sign-decoded to 32-bit length and then stored in a register r12 (43).

Secondly, the pixel value of the predicted picture which is expressed by an 8-bit unsigned value (corresponds to the pixel value p of the predicted value in FIG. 9) is loaded from the address indicated by the register r7 (corresponds to pp in FIG. 9), and transmitted to the most significant byte of a register 13 (44).

Figure 3:
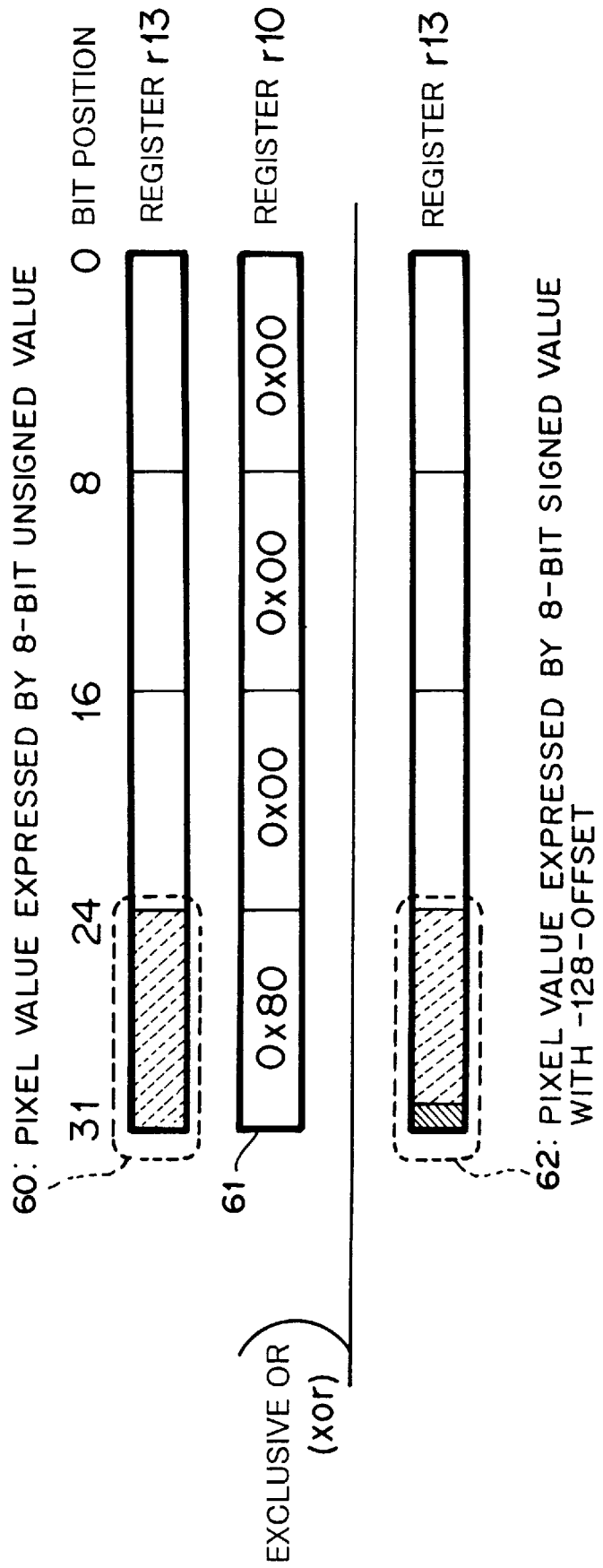
FIG. 3 is a diagram showing an application range of the format conversion in the first embodiment of the present invention.

Thirdly, the most significant bit of the register 13 and the constant on the register 10 are subjected to Exclusive OR to invert the most significant bit (45). This operation is performed as follows. That is, as shown in FIG. 3, the pixel value 60 of the predicted image stored in the most significant byte of the register r13 is subjected to the format conversion shown in FIG. 3 to be set to a 8-bit signed value with −128-offset 62. Alternatively, the pixel value 60 of the predicted picture which is an 8-bit unsigned value is format-converted to a 8-bit signed value with −128-offset, subjected to the 24-bit left shift, and then stored in the register 13 (62).

Fourthly, on the basis of the multiply-accumulate (mac) instruction, the error values and the −128-offset pixel value of the predicted picture which correspond to signed values are added with each other and then the addition result is clipped to the range from −128 to 127 (46). The multiply-accumulate instruction are provided with the constant 0×01000000 which is stored as a multiplicand in the register r11, the error value which is stored as a multiplier in the register r12, and the value obtained by format-converting the pixel value of the predicted picture stored as an accumulate value in the register r13 to −128-offset signed value and then subjecting the signed value with −128-offset to the 24-bit left shift, and then (r11×r12+r13) is calculated.

Figure 4:
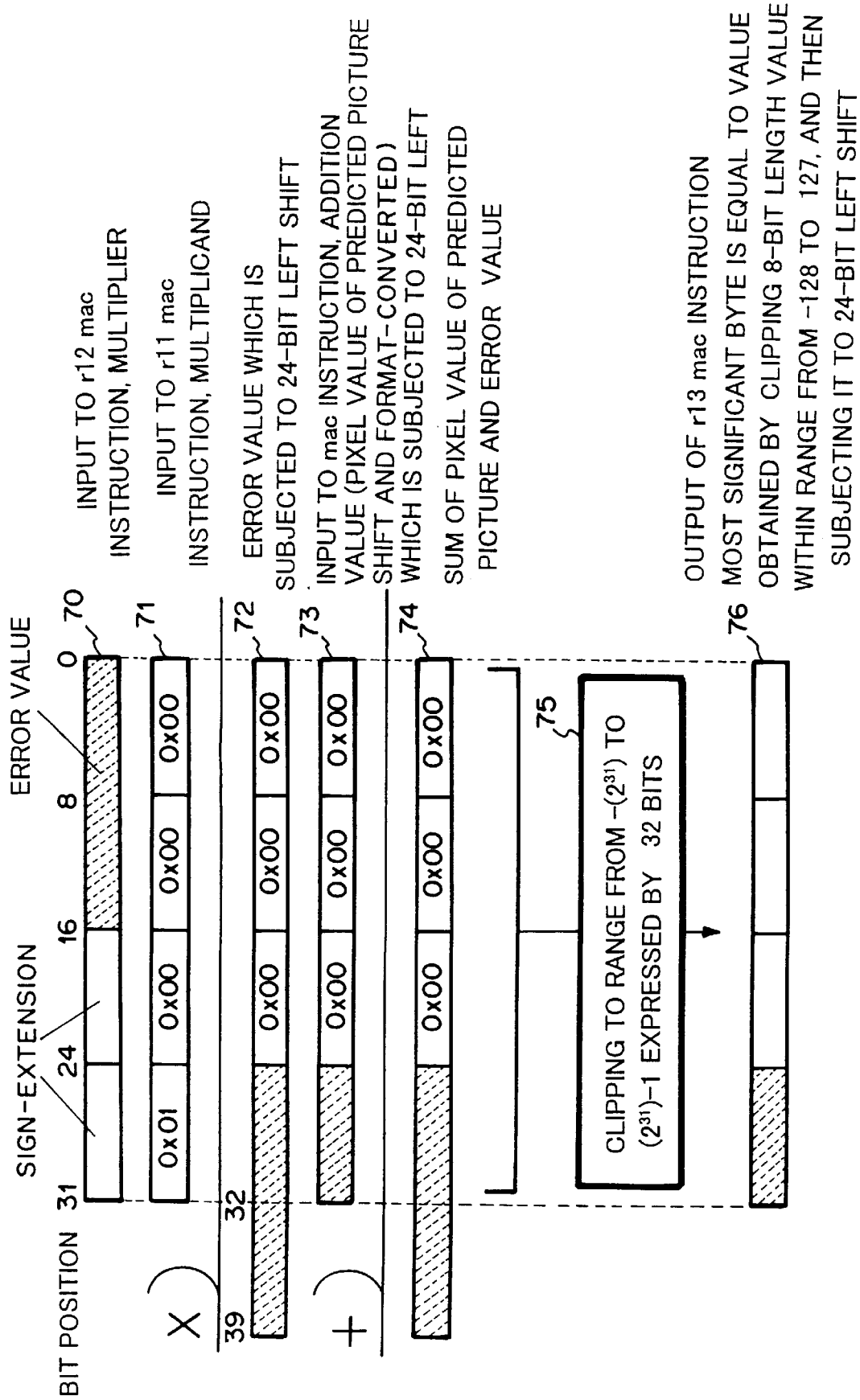
FIG. 4 is a diagram showing the input/output bit position relationship of a multiply-accumulate instruction in the first embodiment of e present invention.

In this case, as shown in FIG. 4, the error value 70 is subjected to 24-bit left shift (72) by the multiplication with the register r11 (71), and then added with the pixel value 73 of the format-transformed pixel value 73 of the predicted picture while matching the digit therebetween (74). The multiply-accumulate instruction clips the addition result within the range which can be expressed by 32-bit signed values, that is, within the range from $-(2^{31})$ to $(2^{31})-1$ (759, however, this clipping operation is equivalent to the clipping to the range from −128 to 127 for values which are subjected to 24-bit left shift.

That is, the result 76 of the multiply-accumulate (mac) instruction 46 is equal to a value which is obtained by adding the error value and the format-converted pixel value of the predicted picture, clipping it to the range from −128 to 127 which can be expressed by 8-bit signed values (the result corresponds to the format-converted pixel of the generated picture) and then subjecting the clipping result to the 24-bit left shift.

Fifthly, the most significant bit of the pixel value of the generated picture which is expressed by the signed value with −128-offset stored in the most significant byte of the register r13 is subjected to exclusive OR with the constant on the register r10 to invert the most significant bit (47). With this operation, the pixel value of the generated picture which his expressed by the −128-offset signed value stored in the most significant byte of the register r13 is inversely format-converted to the pixel value of the generated image which is expressed by a non-offset unsigned value.

Sixthly, in order to store the 8-bit unsigned pixel value of the generated picture stored in the most significant byte of r13 into the main memory, it is subjected to the 24-bit right shift to be transferred to the most insignificant byte, and then the byte length store (s,t,b) instruction is executed (48).

The above processing is repeated while renewing the pointer until the processing of a desired number of pixels is completed (49).

According to the above-described first embodiment, the three instructions of the addition instruction of the pixel value of the predicted picture and the error value and the minimum instruction and the maximum instruction for the clipping processing of the addition result (i.e., the steps 215, 216 and 217 in FIG. 10) which are needed in the conventional technique can be reduced to only one multiply-accumulate (mac) instruction (step 46 in FIG. 2).

Next, a second embodiment according to the present invention will be described. The second embodiment implements the processing more efficiently as compared with the first embodiment.

In the first embodiment, the load 44 of the pixel value of the predicted picture to the register, the format-conversion (45 and 47) of the pixel values of the predicted picture and the generated picture, and the store 48 of the pixel value of the generated picture into the main memory are performed on a one-pixel basis. On the other hand, in the second embodiment, the load of the pixel value of the predicted picture to the register, the format-conversion of the pixel values of the predicted picture and the generated picture, and the store of the pixel value of the generated picture into the main memory are performed every data format in which four pixels are packed into one word (32-bits) length register without any gap (hereinafter referred to as "packed format"), thereby reducing the operation amount per pixel and increasing the speed of the compensation processing.

Figure 5:
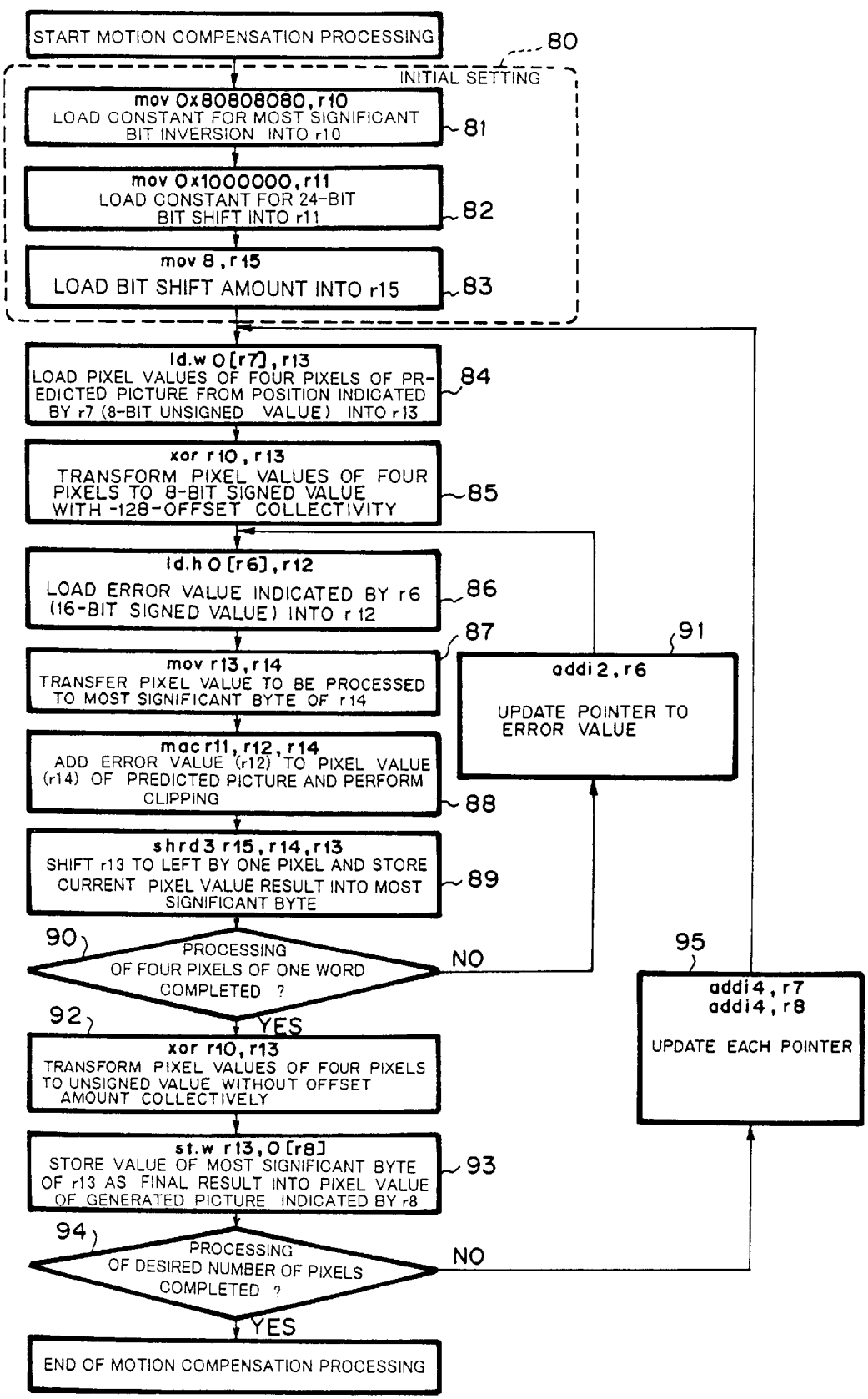
FIG. 5 is a flowchart of a second embodiment of the present invention.

The second embodiment will be described with reference to FIG. 5. First, a constant which is used for the subsequent processing is loaded as an initial setting 80 into the registers r10, r11 and r15. A value of the 32-bit length register in which the most significant bit of each byte is equal to 1 (0×80808080) (81) is loaded into the register r10, a value which is equal to $2^{24}$ is loaded into the register r11 (82) as in the case of the first embodiment, and the constant 8 is loaded into the register r15.

Subsequently, the motion compensation processing is performed on data of packed format. First, the pixel values (corresponding to p in FIG. 9) of four pixels of the predicted picture which are expressed by 8-bit unsigned values are loaded from address indicated by the register r7, and stored in the pack format into the register r13 (84).

Figure 6:
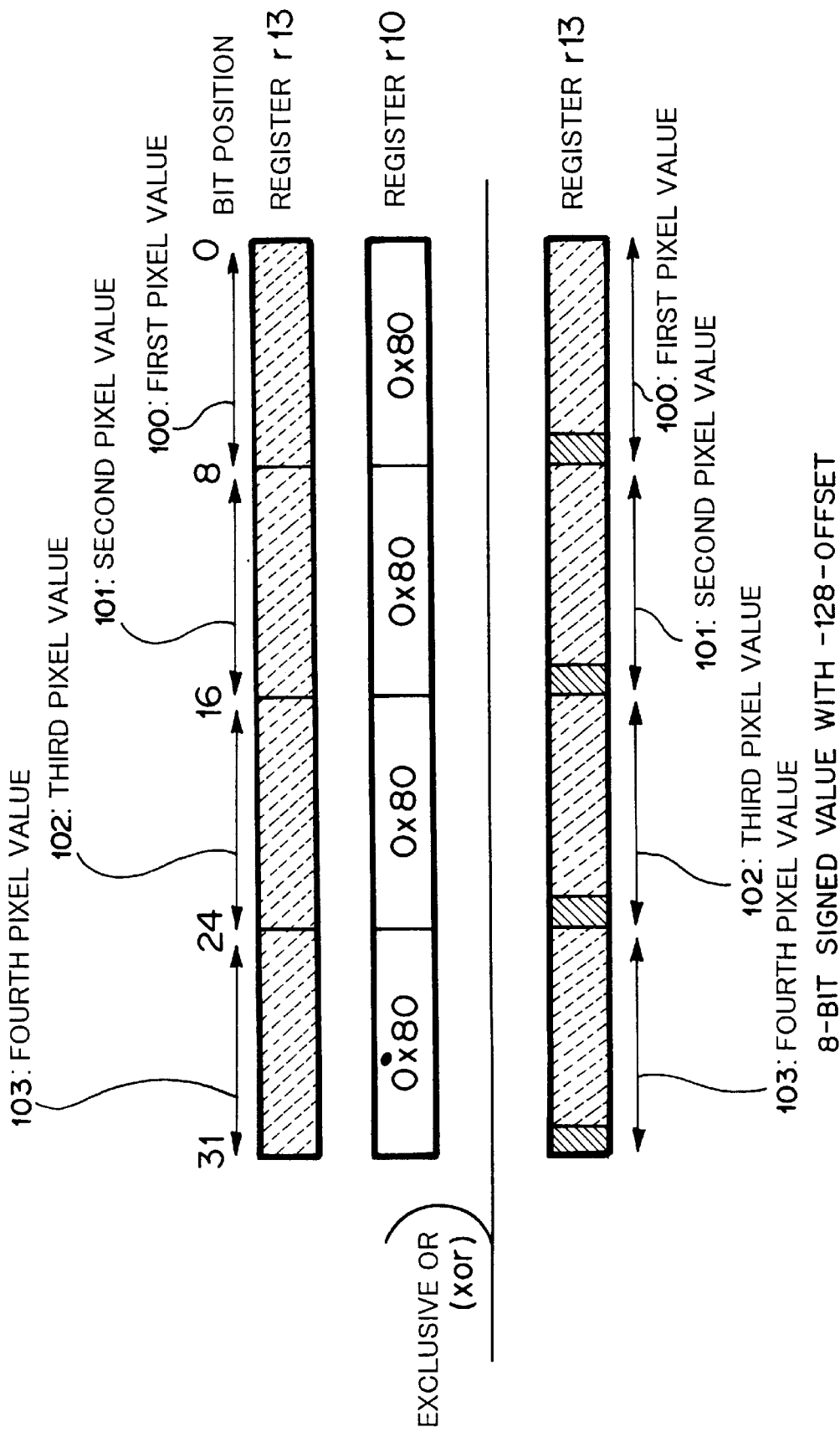
FIG. 6 is a diagram showing an application range of the format transformation on pack type data in the second embodiment of the present invention.

Secondly, the most significant bit of each of the four pixel values of the predicted picture which are stored in the packed format in the register r13 is subjected to the exclusive OR with the constant on the register r10 as shown in FIG. 6 to invert the most significant bit (85). In this operation, the four pixel values of the predicted picture which are stored in the packed format in the register r13 are subjected to the format conversion shown in FIG. 1 so that they are transformed to 8-bit signed values with −128-offset.

Thirdly, the error value corresponding to e in FIG. 9) expressed by 16-bit signed value is taken out from an address indicated by the register r6, sign-decoded to the 32-bit length and stored in the register r12 (86).

Fourthly, the pixel value of the predicted picture which is a target to be processed is transmitted to the most significant byte of the register r14. Out of the pixel values of the four pixels which are stored in the pack format in the register r13, the fourth pixel value stored in the most significant byte is first targeted for the processing, and thus the register 13 is directly copied into r14 (87).

Fifthly, on the basis of the multiply-accumulate (mac) instruction, the error value and the pixel value with −128-offset of the predicted picture which are signed values are added with each other and the addition result is clipped to the range from −128 to 127. The multiply-accumulate instruction are provided with the constant 0×01000000 which is stored as a multiplicand in the register r11, the error value which is stored as a multiplier in the register r12, and the value obtained by format-converting the pixel value of the predicted picture stored as an accumulate value in the most significant byte of the register r14 to signed value with −128-offset, and then (r11×r12+r14) is calculated.

Accordingly, as shown in FIG. 4, the error value 70 is subjected to the 24-bit left shift (72) through the multiplication thereof with the register r11 (71), and added with the format-converted pixel value 73 of the predicted picture stored in the most significant byte of the register r14 while matching the digit therebetween (74). The multiply-accumulate instruction clips the addition result within the range which can be expressed by 32-bit signed values, that is, within the range from $-(2^{31})$ to $(2^{31})-1$, and this clipping operation is equivalent to the operation of clipping in the range from −128 to 127 for the value 74 which is subjected to the 24-bit left shift. That is, the result of the multiply-accumulate (mac) instruction is equal to a valued obtained by adding the error value and the format-converted pixel value of the predicted picture to clipping the addition result within the range from −128 to 127 which are expressed by 8-bit signed values and then subjecting the clipping result (corresponding to the format-converted pixel value of the generated picture) to the 24-bit left shift.

Sixthly, By the double word left shift (shrd3) instruction, the value of 64-bit length obtained by linking the register r14 as a lower word and the register r13 as an upper word is shifted to the left by one pixel (8 bits), and the value of the upper word into the register r13 (89). At this time, the shift amount is indicated by the constant 82 which is loaded into the register r15. By the above operation, the four pixel values of the predicted picture which are stored in the register r13 are shifted to the left by one pixel, and the pixel value of the generated picture which is expressed by the −128-offset signed value and stored in the most significant byte of the register r14 is stored in the most insignificant byte of the register r13.

By repeating the above third to sixth operations (steps 86, 87, 88 and 89) at four times (90) while decrementing the register r6 by an amount corresponding to the size of the error value (2 bytes) (91), the overall motion compensation processing on the data of four pixels which are loaded into r13 in the packed format in the first operation 84 is completed, and the result of four pixels in the packed format is obtained in the register r13. The result thus obtained in the register r13 is expressed by signed values with −128-offset. Therefore, the inverse format conversion shown in FIG. 1 is collectively performed on the packed-format data shown in FIG. 6 to transform the data to non-offset unsigned values (92), and then the data are stored every pack-format data into the main memory (93).

The processing on the four pixel values stored in the packed format in the register (from 84 to 93) is repeated (94) while renewing the pointer to the pixel value (95), whereby the processing is performed on all the desired pixels.

In the above-described second embodiment, the operation every pixel can be performed with four instructions (from 86 to 89) and the operation on the four pixel packed-format data can be performed with four instructions (84, 85, 92, 93), that is, the motion compensation processing can be performed with five instructions for each pixel. As compared with the conventional motion compensation processing (FIG. 10) which needs seven instructions per pixel, the overall processing speed can be increased more by about 40% on the assumption that the processing speed of each instruction is equal. Since the motion compensation processing needs the largest operation amount in the video decompression, the high-speed motion compensation adder of this embodiment greatly contribute to the enhancement of the performance of the video decompression processing soft ware.

Further, in the second embodiment, the load and the store of pixel values are performed every four pixels in packed format, so that the access frequency of the main memory may be more greatly reduced compared with the case where the load and the store are performed every pixel like the prior art. This further increases the processing speed in a microprocessor having a write-back type cache memory like V830.

In this embodiment, the 32-bit microprocessor of NEC is used for convenience's sake, however, the application target of the high-speed motion compensation adder of the present invention is not limited to V830, and the same manner as described above may be applied to microprocessors other than V830, for example, a microprocessor having a multiply-accumulate instruction which has been reputed as supporting the multimedia processing or signal processing. The bit width of the register file and the operator of the microprocessor is not limited to 32 bits, and the same manner as described above may be applied to a microprocessor having a 16-bit or 64-bit register file or operator. Further, the motion compensation adder of the present invention may be applied to a microprocessor which does not have such a load store architecture that only data on the register file are set as an operand, but which enables direct operations between operands put on the register file and the main memory 10.

Further, the motion compensation adder of the present invention my be applied to a microprocessor having SIMD (Single Instruction Multiple Data) which is specified to multimedia processing or signal processing, or a microprocessor having an execution unit and a register file which are exclusively used for multimedia processing or signal processing.

Still further, the present invention is not limited to MPEG-1, and may be applied to other systems using motion pictures such as MPEG-2, H.261, etc. which use motion compensation adding means.

The effect of the present invention resides in that the operation amount needed for the motion compensation can be greatly reduced. In the prior art, the three instructions (215, 216, 217) are needed for the addition 202 and the clipping processing 200, however, these instruction can be replaced by only one multiply-accumulate instruction in the first and second embodiments.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A motion compensation adder comprising:
   means for format-converting a pixel value of a predicted picture which is expressed by (n−1)-bit unsigned value to $(-2^{n-1})$-offset (n−1)-bit signed value;
   means for performing addition of the pixel picture value of the predicted picture after the format conversion and the error value expressed by signed value;
   a clipping processing of limiting the addition result to a range which can be expressed by (n−1)-bit signed value, on the basis of a multiply-accumulate operation instruction having saturation function; and
   means for inversely format-converting the result after the clipping processing to (n−1)-bit unsigned value again.

2. The motion compensation adder as claimed in claim 1, wherein n is equal to 4.

3. The motion compensation adder as claimed in claim 1, wherein the multiply-accumulate operation instruction of having the clipping function performs multiply, addition of the multiplication result and the accumulated value and said clipping processing on the addition result by one instruction.

4. The motion compensation adder as claimed in claim 3, wherein the multiply-accumulate(mac) operation instruction performs, with only one instruction, digit weight matching between the error value and the pixel value of the predicted picture by using the multiply portion of the mac operation/instruction, the addition of the pixel value of the predicted picture and the error value by using the addition portion of the mac operation/instruction.

5. A motion compensation adder comprising:
   means for storing a plurality of pixel values of a predicted picture expressed by (n−1)-bit unsigned values into one register to collectively format-converting the pixel values to $(-2^{n-1})$ offset (n−1)-bit signed values;
   means for performing addition of the pixel value of the predicted picture after the format conversion and the signed error value, and clipping processing of limiting the addition result to a range which can be expressed by (n−1)-bit signed value, on the basis of a multiply-accumulate operation instruction having saturation function; and
   means for storing a plurality of clipping results into one register again and collectively inversely format-converting the clipping-processing results to (n−1)-bit unsigned value again.

6. The motion compensation adder as claimed in claim 5, wherein n is equal to 4.

7. The motion compensation adder as claimed in claim 5, wherein 8-bit length pixel values of four pixels are stored in a 32-bit length register and then subjected to format conversion.

8. The motion compensation adder as claimed in claim 5, wherein 8-bit length pixel values of four pixels are stored in a 32-bit length register and then subjected to inverse format conversion.

9. The motion compensation adder as claimed in claim 5, wherein 8-bit length pixel values of four pixels are stored in a 32-bit length register and then subjected to format conversion and inverse format conversion.

10. The motion compensation adder as claimed in claim 5, wherein 8-bit length pixel values of eight pixels are stored in a 64-bit length register and then subjected to format conversion.

11. The motion compensation adder as claimed in claim 5, wherein 8-bit length pixel values of eight pixels are stored in a 64-bit length register and then subjected to inverse format conversion.

12. The motion compensation adder as claimed in claim 5, wherein 8-bit length pixel values of eight pixels are stored in a 64-bit length register and then subjected to format conversion/inverse format conversion.

* * * * *